United States Patent [19]
Otto

[11] Patent Number: 5,001,551
[45] Date of Patent: Mar. 19, 1991

[54] NISC COMPATIBLE TWO-CHANNEL TRANSMISSION APPARATUS FOR ENHANCED DEFINITION TELEVISION

[75] Inventor: Detlev Otto, Knoxville, Tenn.

[73] Assignee: North American Philips Corporation, New York, N.Y.

[21] Appl. No.: 377,368

[22] Filed: Jul. 7, 1989

[51] Int. Cl.$^5$ .................... H04N 11/06; H04N 11/20; H04N 7/04; H04N 11/12
[52] U.S. Cl. ........................................ 358/12; 358/11; 358/141; 358/15
[58] Field of Search ...................... 358/11, 12, 13, 14, 358/16, 141, 142

[56] References Cited

U.S. PATENT DOCUMENTS

| | | | |
|---|---|---|---|
| 2,987,617 | 6/1961 | Loughlin | 358/12 |
| 3,813,483 | 5/1974 | Kurosawa | 358/417 |
| 4,473,837 | 9/1984 | Tiemann | 358/12 |
| 4,521,803 | 6/1985 | Gittinger | 358/12 |
| 4,567,508 | 1/1986 | Hulyer | 358/11 |
| 4,589,011 | 5/1986 | Rzeszewski | 358/12 |
| 4,605,950 | 8/1986 | Goldberg | 358/12 |
| 4,652,904 | 3/1987 | Van de Polder | 358/12 |

FOREIGN PATENT DOCUMENTS

134692  7/1985  Japan .
5963758 10/1985  Japan .

*Primary Examiner*—James J. Groody
*Assistant Examiner*—Wendy R. Greening
*Attorney, Agent, or Firm*—Edward W. Goodamn

[57] ABSTRACT

An apparatus for encoding and transmitting video signals including a circuit for separating the video signals into two complementary signals for processing in two separate transmission paths; in a first of the paths, a circuit for separating a portion of one of the two complementary signals corresponding to a standard video signal; and a circuit for transmitting this portion over a first standard transmission channel; and in a second of the paths, a circuit for dividing the other of the two complementary signals into consecutive intervals, each interval having a predetermined time duration; a circuit for time delaying every other one of the intervals for the predetermined time interval such that consecutive two intervals of the video signal appear simultaneously; a circuit for time expanding the pairs of intervals by a factor of two thereby reducing the bandwidth thereof by one-half; a circuit for amplitude modulating in quadrature each pair of intervals onto a carrier having a frequency located in the middle of the transmission band; and a circuit for transmitting the quadrature modulated signal over a second standard transmission channel. An apparatus for receiving the encoded high definition television signals is also provided and includes a circuit for inversely decoding the signals on the first channel, a circuit for inversely decoding the signals on the second channel, and a circuit for combining the output of the two decoding circuits.

6 Claims, 8 Drawing Sheets

NISC COMPATIBLE TWO-CHANNEL TRANSMISSION APPARATUS FOR ENHANCED DEFINITION TELEVISION

BACKGROUND OF THE INVENTION

1. Field of the Invention

The subject invention is related to high definition television and to a system for transmitting high definition television signals over standard terrestrial and cable television transmission channels.

2. Description of Related Art

Color television signals are currently being transmitted to consumers in accordance with one of several television transmission standards, for example, NTSC and PAL. These standards prescribe various characteristics of the transmission signal, i.e., 525 or 625 scanning lines presented in two consecutive, interlaced fields forming each picture frame at a field rate of 60 (or more precisely 59.94) or 50 Hz, to be transmitted over a transmission channel having a bandwidth of at most 6 MHz.

Over the last few years, there has been increased interest in improving the quality of the received television picture. One of these areas is improving the horizontal and vertical resolution of the television signal. Another area is to change the aspect ratio from a standard ratio of 4:3 to a wide-screen ratio of 16:9. A benefit of this wide-screen ratio is that it is substantially similar to the aspect ratio used in preparing motion pictures. Therefore it would no longer be necessary to clip side portions of the picture in order to present the same on television. Another of these areas is an improvement in the quality of the audio signal accompanying the transmission.

A common problem in each of the above areas of improvement is that, without special encoding, bandwidth in excess of the above prescribed 6 MHz is required. This, in turn, raises another problem.

In the United States, for example, there is a substantial universe of NTSC television receivers. If one were to look back in time to the advent of color television, one should note that in deference to the universe of black-and-white televisions, the Federal Communications Commission (FCC) ruled that any color television signal transmission must be compatible with these black-and-white television receivers.

This same stance is being taken by the FCC with respect to HDTV transmissions, i.e., they must be compatible with the universe of existing NTSC television receivers. In this instance, compatibility means that a standard television, while not being able to display an HDTV picture, may nonetheless be capable of showing a standard display using the same transmission.

SUMMARY OF THE INVENTION

An object of the present invention is to provide a method and apparatus for encoding television signals enabling the transmission of a HDTV wide-screen signal on standard television channels while still being compatible with the existing standard television receivers.

This object is achieved in an apparatus for encoding and transmitting video signals comprising means for separating the video signals into two complementary signals for processing in two separate transmission paths; in a first of said paths, means for separating a portion of one of the two complementary signals corresponding to a standard video signal; and means for transmitting this portion over a first standard transmission channel; and in a second of said paths, means for dividing the other of the two complementary signals into consecutive intervals, each interval having a predetermined time duration; means for time delaying every other one of the intervals for the predetermined time interval such that consecutive two intervals of said video signal appear simultaneously; means for time expanding the pairs of intervals by a factor of two thereby reducing the bandwidth thereof by one-half; means for amplitude modulating in quadrature each pair of intervals onto a carrier having a frequency located in the middle of the transmission band; and means for transmitting the quadrature modulated signal over a second standard transmission channel.

Since the video signals are conveniently in the form of scanning lines, it is advantageous that the consecutive intervals of the second path be the scanning lines, and the predetermined time interval be the time duration of each of the scanning lines.

A further object of the invention is to eliminate distortions in the image presentation, for example cross color and cross luminance, which are present in displaying video signals in accordance with the above standards.

This further object is achieved in that the above apparatus further includes matrix means for receiving the other complementary signal and for separately providing luminance and chrominance components, included in the other complementary signal, at respective outputs thereof, the time delaying means being coupled to receive the luminance component; means coupled to an output of the matrix means for suppressing alternate intervals of the chrominance component corresponding, in time, to the intervals of the luminance component to be delayed in the time delaying means; third expanding means coupled to an output of the suppressing means for expanding the unsuppressed chrominance component by a factor of 7:3; means for combining the luminance component at the output of the second time expanding means with the chrominance component at an output of the third time expanding means, wherein the amplitude modulation in quadrature means is coupled to the output of the first time expanding means and an output of the combining means; and means for bandwidth limiting the luminance component at the output of the second expanding means, whereby the bandwidth limited luminance component and the chrominance component are separated from each other in frequency.

In order to improve the audio signal associated with the video signals, the subject invention contemplates quadrature modulating two digital audio signal about the same carrier as the video signals and then transmitting the resulting modulated signal during the vertical blanking periods of the quadrature modulated video signal.

BRIEF DESCRIPTION OF THE DRAWINGS

With the above and additional objects and advantages in mind as will hereinafter appear, the invention will be described with reference to the accompanying drawings, in which:

FIG. 1a is a diagrammatic illustration of the principle of two-channel HDTV transmission in accordance with the subject invention, and FIG. 1b is an enlargement of a portion of FIG. 1a;

FIG. 7a shows the frequency spectrum for the signal produced in the in-phase channel, while

DESCRIPTION OF THE PREFERRED EMBODIMENT

The following description is based on a high definition television signal having 525 lines progressively scanned in a picture frame, a 59.94 Hz frame rate, and a 16:9 aspect ratio. However, it should be understood that other formats for the signal may be used with the subject invention.

Figures 1A, 1B:
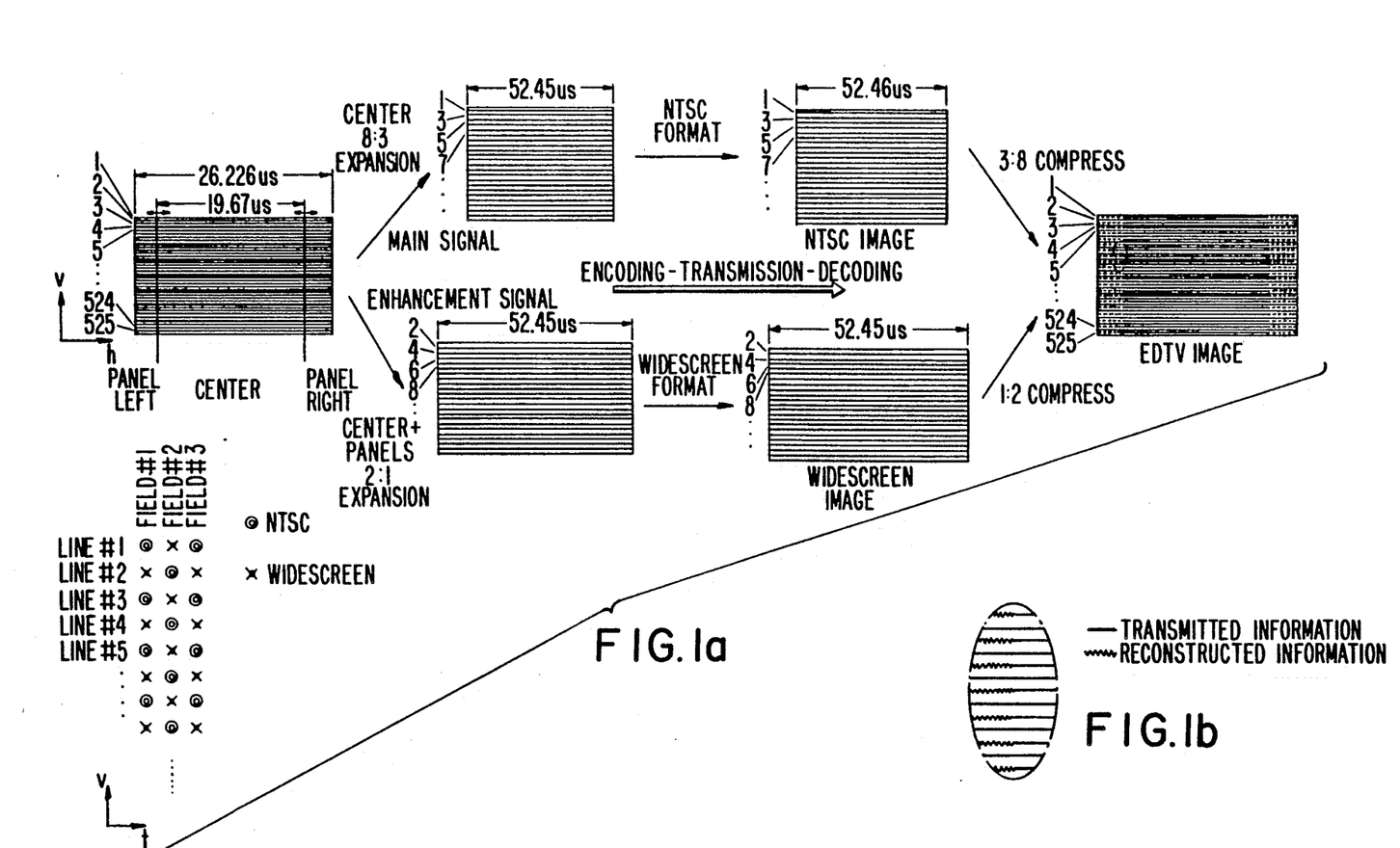

As illustrated in FIG. 1a, the HDTV signal is split into two parts, a main signal and an enhancement signal. The main signal consists of 75% of every other line in the HDTV signal which is equivalent to the signal obtained from a standard NTSC source. The enhancement signal consists of 100% of the intervening lines in the HDTV signal.

The main signal is time expanded by 8:3, encoded in accordance with the NTSC standard and transmitted on a first standard television channel. The enhancement signal time expanded by 2:1 and is encoded in accordance with a wide-screen encoding principle to be described later, and is transmitted on a second standard television channel.

A standard NTSC receiver tuned to the first television channel will prove an improved NTSC picture quality due to preprocessing of the signal at the receiver. A wide-screen receiver tuned to the second television channel will provide a wide-screen picture with improved horizontal resolution and digital audio. Improved vertical resolution is achieved by interpolating and/or median filtering to reconstruct the non-transmitted lines. Finally, an HDTV receiver tuned to both the first and second television channels will provide a wide-screen picture with double vertical resolution in the center portion of the image, improved vertical resolution in the panel sections, and significantly improved horizontal resolution over the whole picture. It should be noted that, as shown in FIG. 1b, it is necessary to form by interpolation the panel portions of the lines in the signal on the first television channel.

Figure 2:
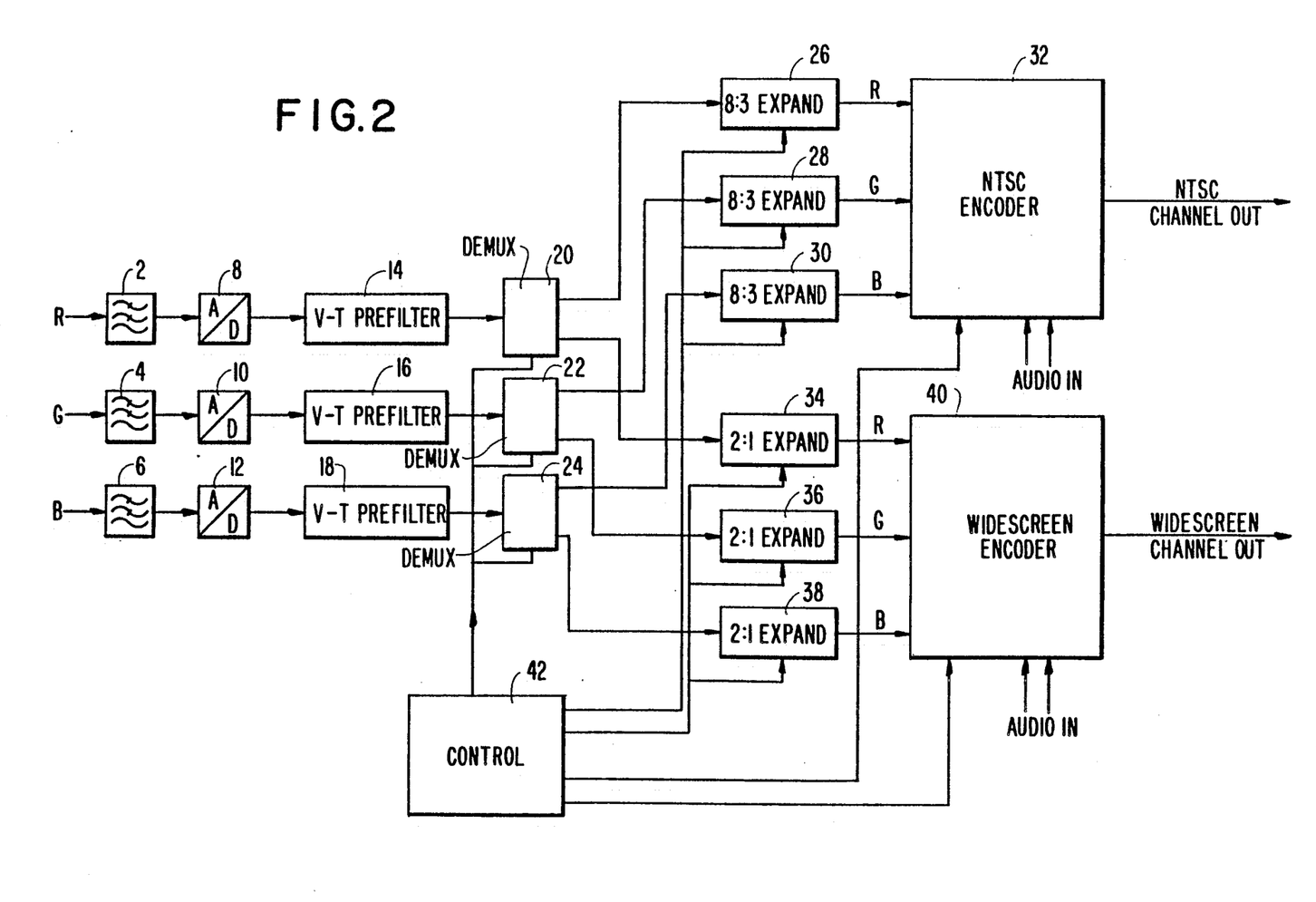
FIG. 2 is a block diagram of an encoder in accordance with the subject invention.

Referring to FIG. 2, an encoder for the subject invention includes low-pass filters 2, 4 and 6 for filtering the HDTV input video signals R, G and B. These filtered signals are then digitally converted in analog-to-digital (A/D) converters 8, 10 and 12. A two-dimension prefiltering in the vertical and temporal dimension is performed on the digital signals in v-t prefilters 14, 16 and 18 to remove alias components present in the signal due to the scanning process.

The outputs of the v-t prefilters 14, 16 and 18 are then applied to respective demultiplexers 20, 22 and 24 which supply alternate lines of the filtered digital signals at their respective outputs and also separate the center section from the panel sections for the NTSC channel.

In the NTSC channel, the center section signals are time expanded in 8:3 time expansion circuits 26, 28 and 30 and are then applied to a standard digital NTSC encoder 32 for transmission on the first standard television channel. The NTSC encoder 32 also includes inputs for receiving an audio signal to be transmitted also on the first television channel.

In the enhancement channel, the respective outputs of the demultiplexers 20, 22 and 24 are time expanded in 2:1 time expansion circuits 34, 36 and 38, the outputs therefrom being applied to a wide-screen encoder 40 to be described below. This wide-screen encoder 40 also receives digital audio signals and transmits an encoded signal on the second television channel. A control circuit 42 provides timing control signals for each of the components in the encoder.

Figure 3:
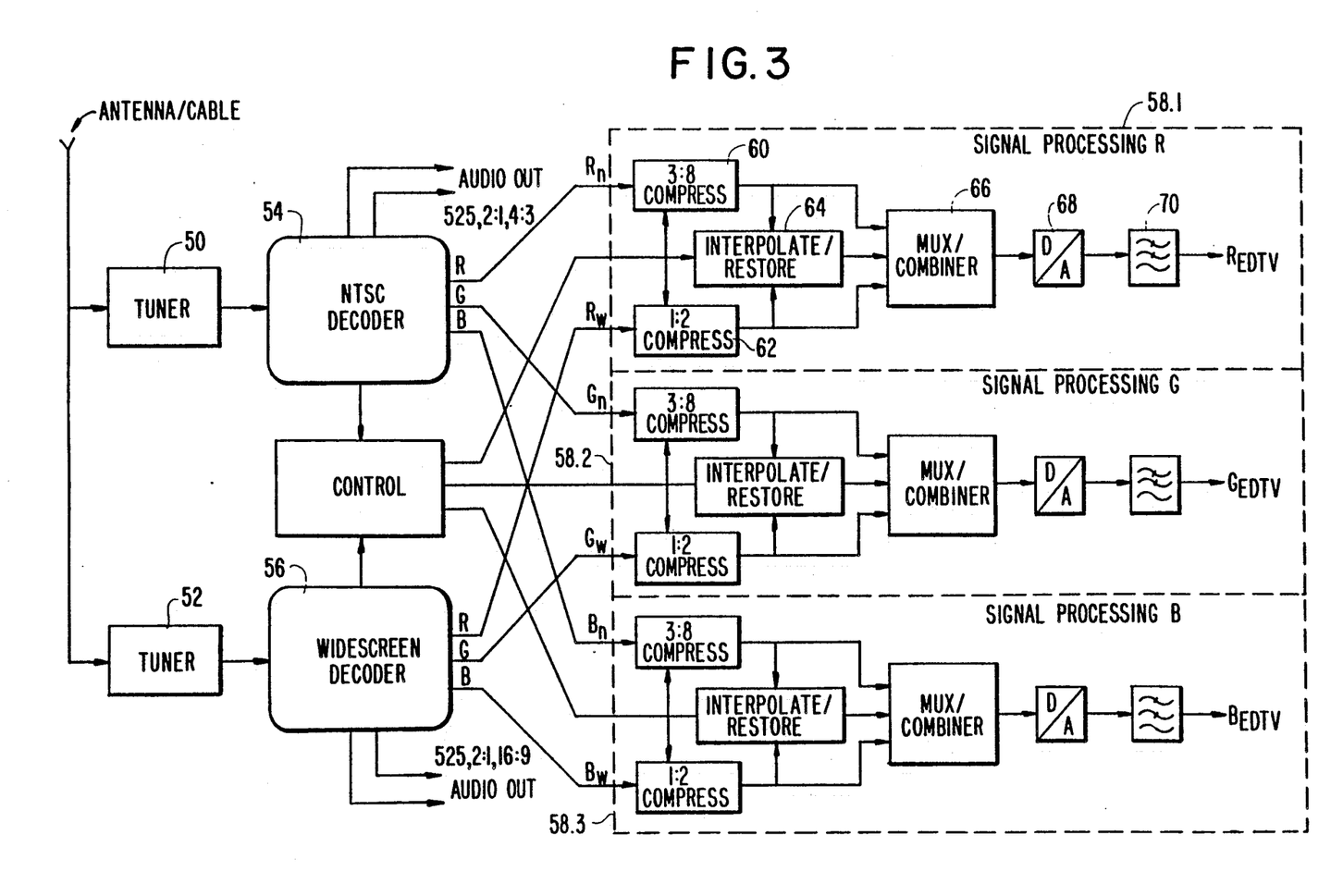
FIG. 3 is a block diagram of a decoder in accordance with the subject invention.

FIG. 3 shows a block diagram of a two-channel decoder for use in an HDTV receiver. The decoder includes a first and second tuner 50 and 52 for receiving the signals transmitted on the first and second television channels, respectively. These signals are then applied to an NTSC decoder 54, which provides digital R, G and B components of the main signal along with analog audio signals, and a wide-screen decoder 56, which provides digital R, G and B components of the enhancement signal along with digital audio signals.

The outputs from the encoders 54 and 56 are provided to three separate signal processing circuits 58.1, 58.2 and 58.3. Since these processing circuits are identical, only one of which will be described.

The signal processing circuit 58.1 includes a 3:8 time compression circuit 60 for receiving the R component from the NTSC decoder 54 and a 1:2 time compression circuit 62 for receiving the R component from the wide-screen decoder 56. The outputs from these time compression circuits 60 and 62 are applied to an interpolation/restoration circuit 64 and to a multiplexer/combiner 66, which also receives the output from the interpolation/restoration circuit 64. The output from the multiplexer/combiner 66 is applied to a digital-to-analog (D/A) converter 68 followed by a low pass filter 70 for providing the analog restored HDTV R component for application to a display device (not shown).

Figure 4A:
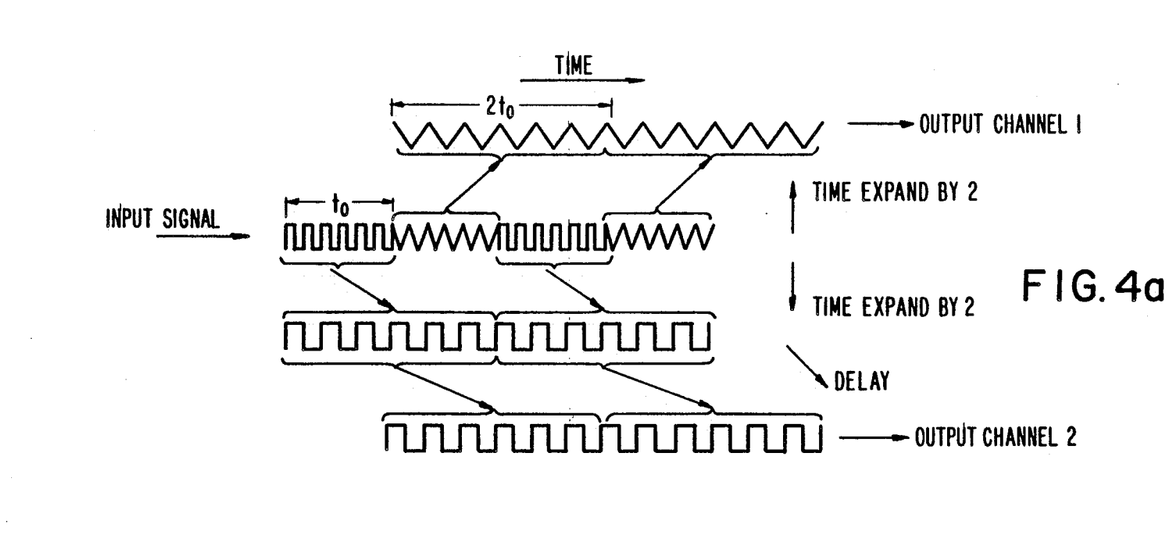
FIGS. 4a and 4b are signal diagrams showing the principles of the wide-screen encoding of the subject invention in the time domain and the frequency domain.
Figure 4B:
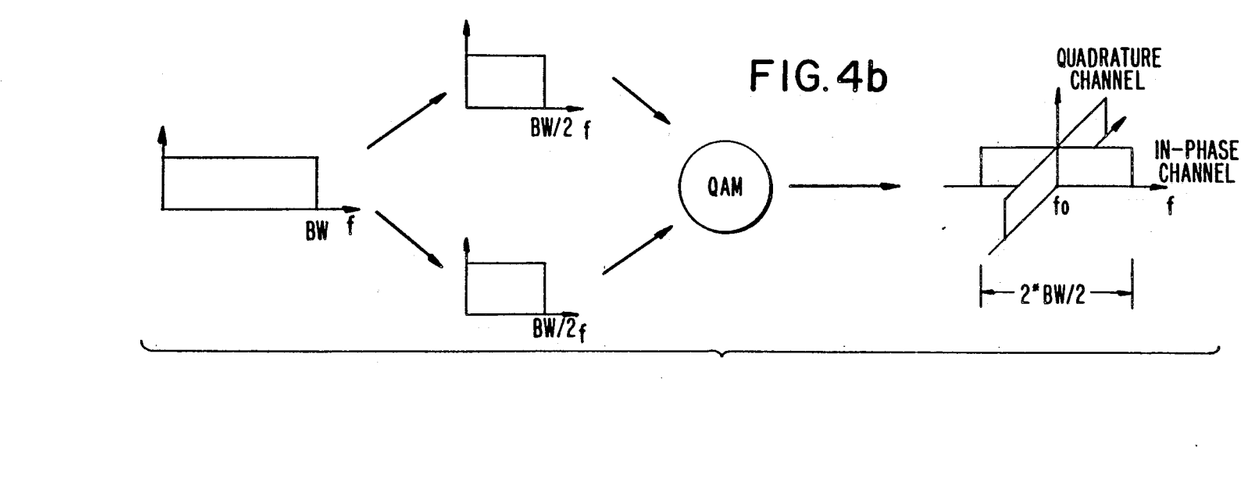

The basic idea of the wide-screen encoding, as illustrated in FIGS. 4a and 4b, is to separate a signal, continuous in time with a bandwidth of BW, into intervals I(n), where n=1, 2, 3, ..., each interval having a time duration of t(0). Each interval is then time expanded by a factor of two to 2*t(0), resulting in a bandwidth reduction to BW/2. Alternate intervals are then delayed by t(0) with respect to the intervening intervals. Accordingly, two consecutive intervals I(n) and I(n+1), where n=1, 3, 5, ..., are available in parallel and are amplitude modulated in quadrature onto a carrier located in the center of the transmission band. The quadrature modulation allows the transmission of two essentially independent signals which compensates for the time expansion applied to the signal beforehand. Since amplitude modulation is used, the signal may have a DC content, which makes this principle suitable for television signals.

When applying the subject encoding scheme to video signals, a convenient interval I(n) is one scanning line. In addition, since in the standard NTSC format, the vertical blanking time amounts to 42 out of every 525 scanning lines, this period may be used for transmitting two high quality digital audio channels.

Figure 5:
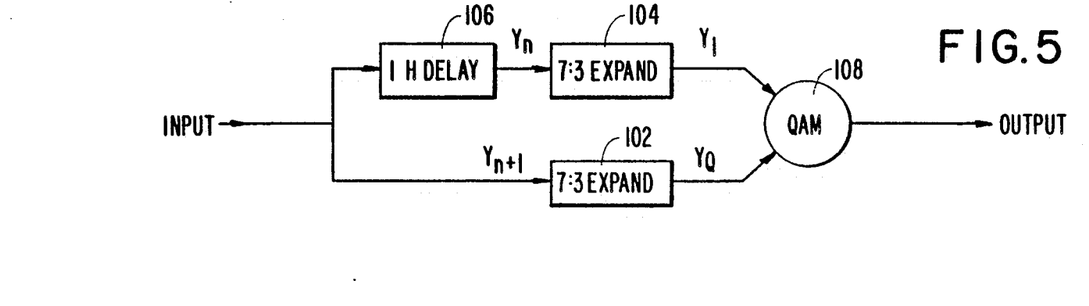
FIG. 5 shows a simplified block diagram depicting the principle of the wide-screen encoding.
Figure 6:
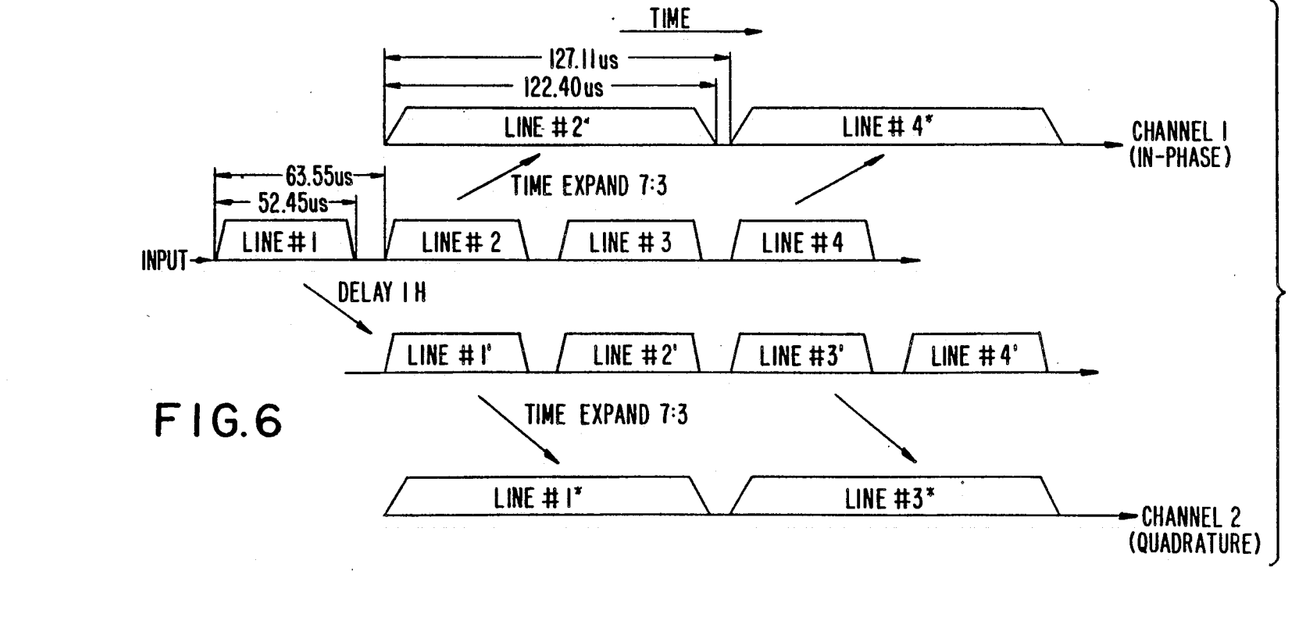
FIG. 6 shows the timing of signal waveforms occurring in the diagram of FIG. 5.
Figure 7A:
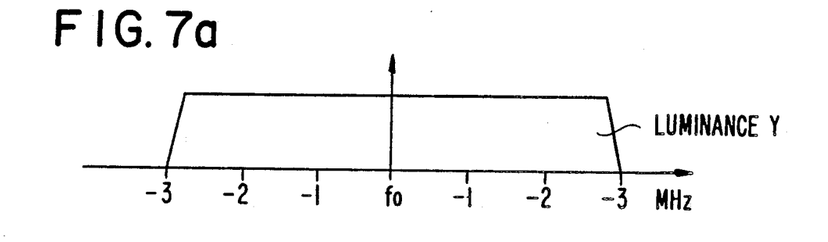
Figure 7B:
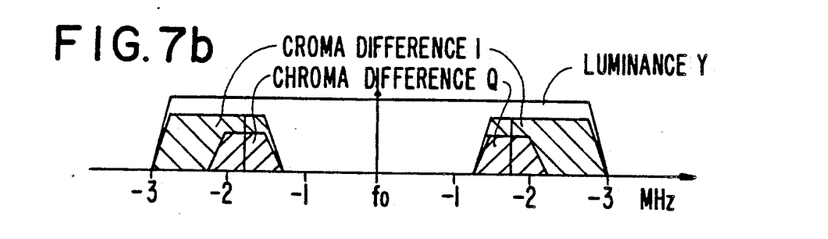
FIGS. 7b–7d show alternative embodiments of the frequency spectrum produced in the quadrature channel.
Figure 7C:
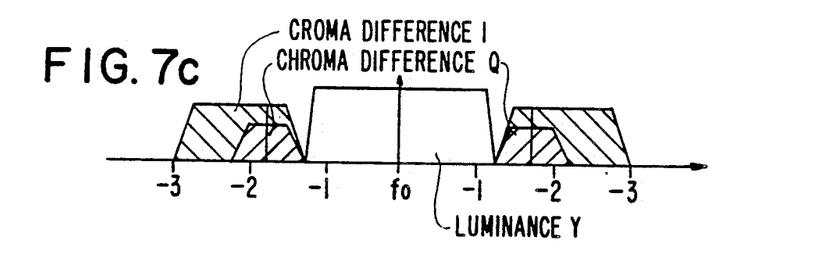
Figure 7D:
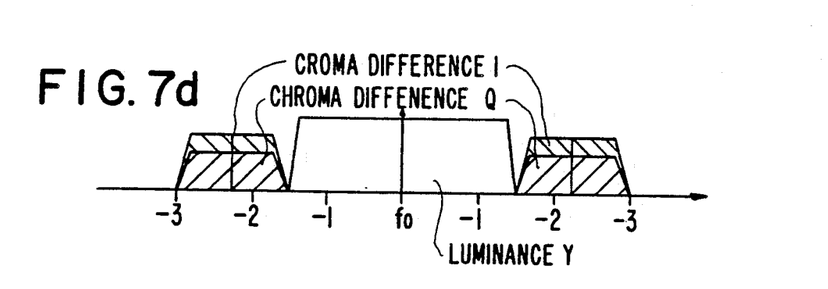

In FIG. 5, the basic signal processing path for the luminance signal is shown, while in FIG. 6, timing signal diagrams depicting this process is shown. It should be understood that a similar processing is carried out on the chrominance signal. The incoming luminance signal Y is split into two parts, one part, Y(n+1), is applied directly to a first time-expansion circuit 102, while the other part, Y(n), is applied to a second time-expansion circuit 104 via a delay 106 having a delay time of 1H (63.55 us for NTSC). As noted above, the subject invention proposes to time expand the intervals by a factor of two. Since the active video portion of each scanning line occupies 52.45 us out of the 63.55 us line duration, a factor of 7:3 is chosen for time expansion resulting in an active video time of 52.45*(7:3)=122.40 us. Since the overall line time due to a 2:1 time expansion is 127.11, this leaves 4.71 us for line blanking and chroma burst.

Both expanded components Y(I) and Y(Q) are now modulated in quadrature in modulator 108 onto the same carrier allowing a bandwidth of two times one-half of the original bandwidth (double-sideband quadrature amplitude modulation), centered around the carrier in the middle of the transmission band. During the vertical blanking time, the same quadrature modulator 108 may be used for digital modulation, when driven from two bipolar digital signals of 6 MBits/s each, the resulting modulation being quadrature phase shift keying (QPSK) around the same carrier.

The above process allows for the insertion of the chrominance signal in a manner similar to that in the NTSC standard. However, applicant has noticed that since the characteristics of the human visual system cannot resolve high vertical and horizontal detail at the same time, one can be traded off against the other, and that the human visual system cannot resolve chrominance detail to the same extent as luminance detail. Hence, the subject invention contemplates transmitting the chrominance information every other line, reducing the luminance bandwidth every other line, and using the spectrum freed by this band-limiting process to transmit the chrominance for complete luminance/chrominance separation.

FIG. 7 shows different possibilities as to how the spectral distribution of the two channels (in-phase and quadrature), prior to being modulated, may be realized. In particular, FIG. 7a shows the frequency spectrum of the in-phase channel which, in this example, does not contain the chrominance information. In FIG. 7b, both chrominance signals I and Q are modulated in quadrature onto a subcarrier at one-half of the NTSC chrominance subcarrier frequency f(sc)/2 and are spectrally interleaved with the luminance spectrum as in the NTSC standard. In FIG. 7c, the chrominance signals are arranged as in FIG. 7b, however, the luminance signal is low-pass filtered thereby resulting in complete luminance/chrominance separation. FIG. 7d is similar to FIG. 7c, with the exception that the chrominance subcarrier is chosen for symmetrical and equal chrominance spectra for both I and Q.

Figure 8:
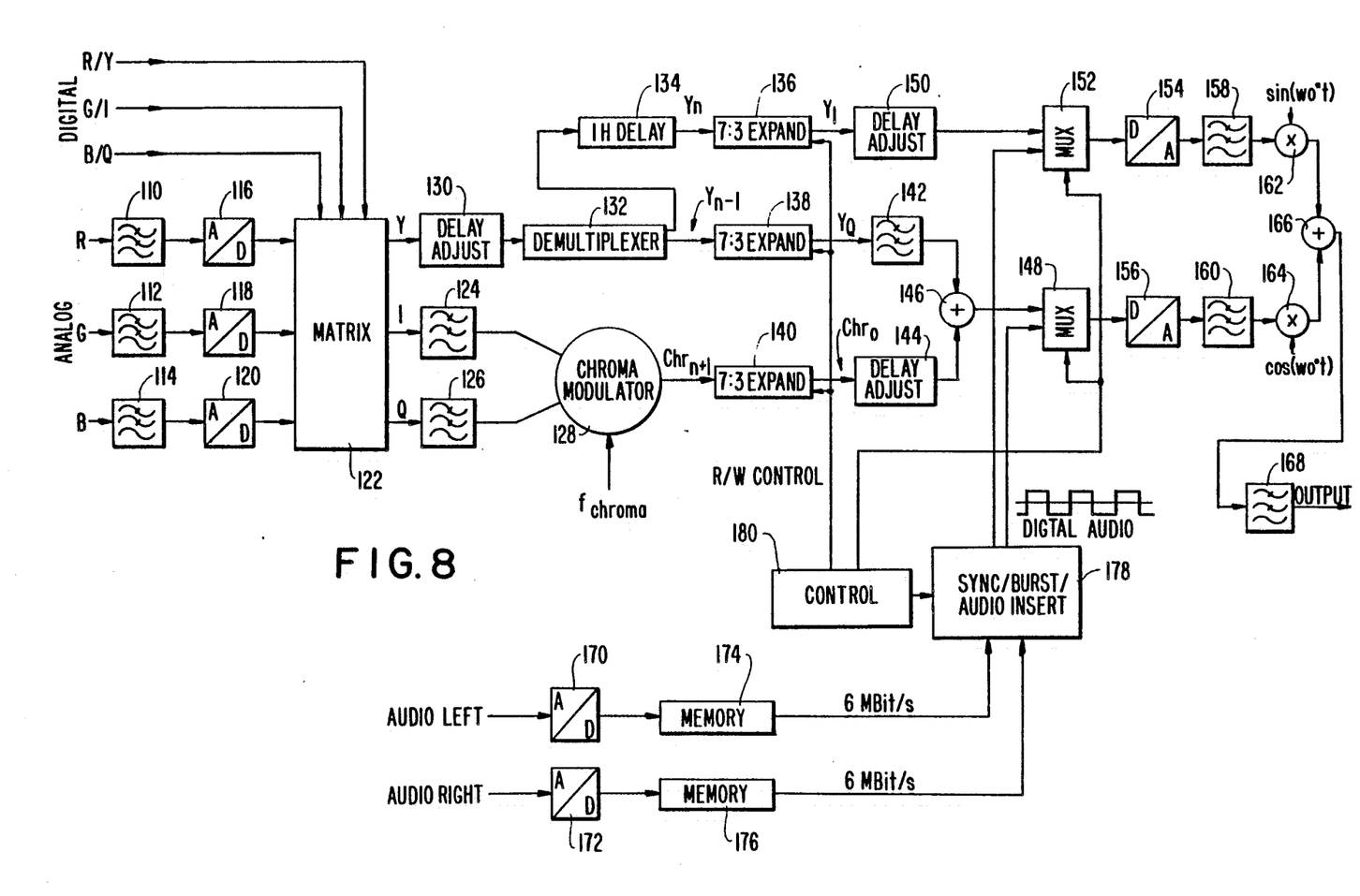
FIG. 8 shows a block diagram of a wide-screen encoder for use in the encoder of FIG. 2.

FIG. 8 shows an embodiment of a widescreen encoder incorporating the principles of the invention. The input RGB signals are low-pass filtered in low-pass filters 110, 112 and 114 to remove alias components, and are then digitized in A/D converters 116, 118 and 120, and are then transformed into luminance and color difference signals Y, I and Q in matrix circuit 122. Matrix circuit 122 includes a built-in multiplexer enabling the use of digital RGB and/or YIQ signals. The I and Q color difference signals are bandwidth limited to 1.78 MHz by low-pass filters 124 and 126 and are then modulated quadrature in modulator 128 onto a subcarrier of 5.204 MHz ((567/2)*7/3 f(h)'), resulting in the signal designated Chr(n+1) A delay adjust unit 130 in the luminance path ensures timing alignment. This time adjusted luminance signal is applied to a demultiplexer 132 which switches at the line frequency. A first output of the demultiplexer 132 is applied to a 1 H delay unit 134. The output of the delay unit 134, the second output of the demultiplexer 132 and the output of the modulator 128 are applied to respective 7:3 time expansion circuits 136, 138 and 140, the respective outputs being designated Y(I) for the in-phase channel, and Y(Q) and Chr(Q) for the quadrature phase channel. The Y(Q) signal is optionally applied to a low-pass filter 142 for providing the luminance/chrominance separation discussed above. The Chr(Q) is, in this event, applied to a delay adjust unit 44 and the outputs of the low-pass filter 142 and the delay adjust unit 144 are added in adder 146 and applied to a first input of a multiplexer 148. The expanded Y(I) signal at the output of time expansion circuit 136 is applied to a delay adjust unit 150 and is then applied to a multiplexer 152. The multiplexers 148 and 152 allow for the insertion of synchronization and chroma burst signals into each line and the insertion of digital audio signals into the field blanking periods. The outputs of the multiplexers 148 and 152 are applied to respective D/A converters 154 and 156, the outputs from which being low-pass filtered in low-pass filters 158 and 160. The signals therefrom are applied to a quadrature modulator formed by a pair of multipliers 162 and 164 respectively multiplying the output signals of low-pass filters 158 and 160 by two signals of the frequency f(0) but with a phase difference of 90 degrees (sin(wo*t), cos(wo*t)). The outputs of the multipliers 162 and 164 are added in adder 166, and the resulting sum signal is filtered in bandpass filter 168 to suppress out-of-band signals, the final signal to be transmitted being available at the output of the bandpass filter 168.

The analog audio information from both the left and right channels are converted in A/D converters 170 and 172 and are written in respective memories 174 and 176. The contents of the memories 174 and 176 are serially read out at a data rate of 6 MBits/s during the vertical blanking interval and are applied to a sync-/burst/audio insertion block 178, outputs of which are respectively connected to the second inputs of multiplexers 148 and 152. The sync/burst/audio insertion circuit 178 generates the necessary reference signals for synchronization and chroma phase and adds these reference signals to each line of the video signal and to the audio signals before they are applied to the quadrature modulator. The choice of a bipolar signal format results in quadrature phase shift keying (QPSK) modulation for the digital signals in the quadrature modulator without any modifications of the modulator. A controller 180 provides timing signals for the demultiplexer 132, the time expansion circuits 136, 138 and 140, the multiplexers 148 and 152, and the sync/burst/audio insertion circuit 178.

Due to the use of DSB amplitude modulation, it is possible to make use of the direct conversion principle for receiving purposes, in that the modulated signal is heterodyned immediately to baseband without any intermediate steps and frequencies. All selectivity is provided at baseband with low-pass filters avoiding expensive IF filtering.

Figure 9:
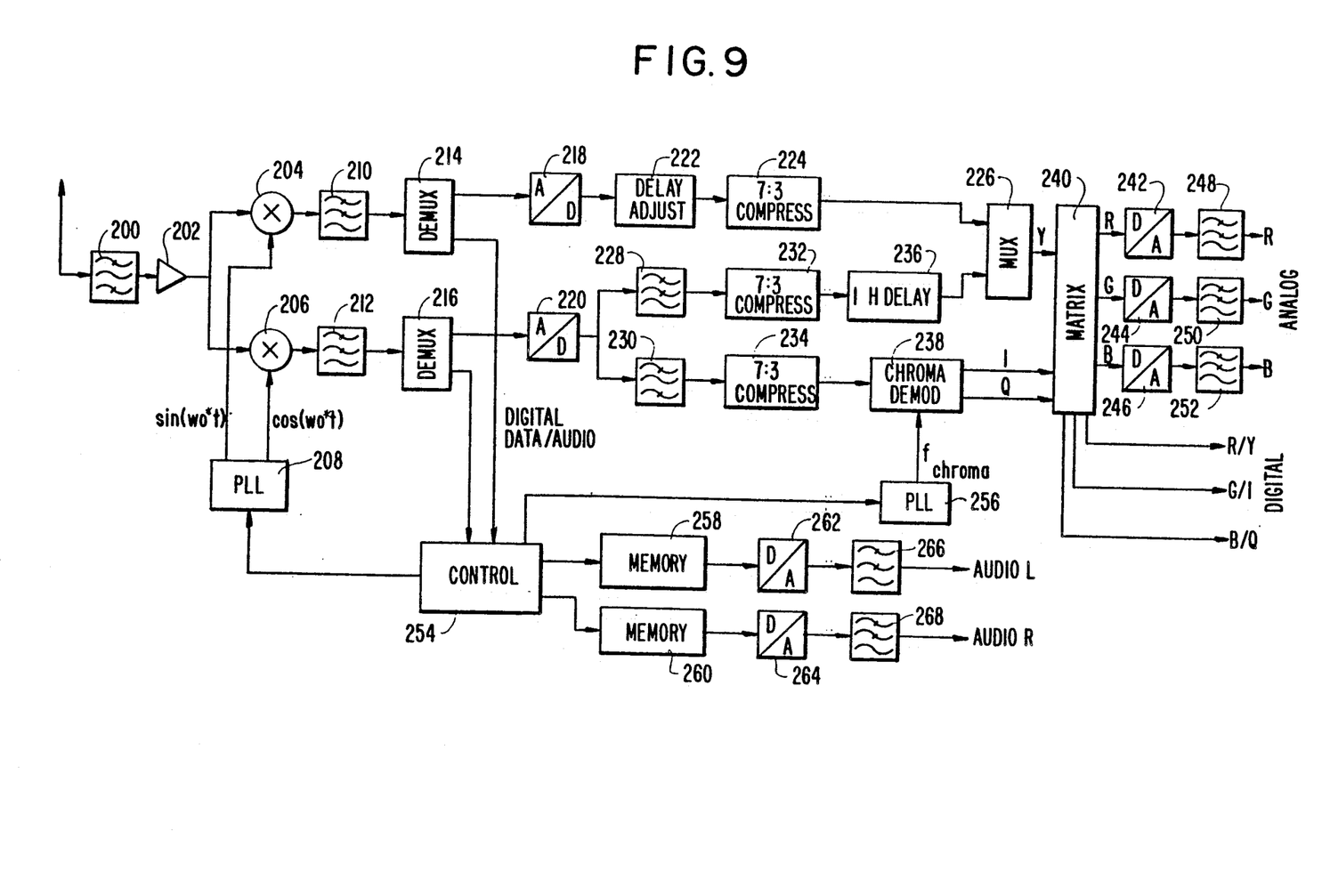
FIG. 9 shows a block diagram of a wide-screen decoder for use in the decoder of FIG. 3.

FIG. 9 shows a block diagram of a widescreen decoder for decoding the wide-screen signals transmitted by the above described widescreen encoder. In particular, the transmitted signal is applied to a bandpass filter 200, the output of which is amplified in an amplifier 202 and applied to a quadrature demodulator consisting of two mixers 204 and 206 which are driven by two signals of the frequency f(0), which is equal to the carrier frequency of the signal to be received, with a phase difference of 90 degrees. These two signals, sin(wo*t) and cos(wo*t), are determined by a phase-locked loop circuit 208 using the sync and burst information of the incoming signal.

At the outputs of the mixers 204 and 206, both the in-phase and quadrature signals are available. These signals are applied to low-pass filters 210 and 212 which reject unwanted out-of-band signals and noise and prove the required selectivity. Two demultiplexers 214 and 216 split the two signals into video and digital data/sync information. The video signals are digitized in A/D converters 218 and 220. The in-phase signal from A/D converter 218, which contains luminance information only, is applied through a delay adjust unit 222 to a 7:3 time compression circuit 224 and then to a first input of a multiplexer 226. The quadrature signal from A/D converter 220, which contains the separated luminance and chrominance signals, is applied to a diplexer consisting of a low-pass filter 228 and a bandpass filter 230, the outputs of which being applied to respective 7:3 time compression circuits 232 and 234, after which the output of the time compression circuit 232 containing the luminance signal is applied via a 1 H delay circuit 236 to the other input of multiplexer 226, while the output of the time compression circuit 234 is applied to a chrominance decoder 238. If the luminance and chrominance signals in the quadrature signal are not separated but are combined in the standard manner, a standard Y/C separation circuit may be used instead of the diplexer 228 and 230.

Since the chrominance information is being transmitted only every other line, the chrominance decoder 238 includes an interpolation circuit for interpolating the chrominance information for the intervening lines, and provides color difference signals at its outputs. These outputs along with the output of the multiplexer 226 are applied to a matrix circuit 240 which has a first set of outputs for directly providing digital RGB/YIQ signals and a second set of outputs for providing the digital RGB signals.

The digital data/sync information from the demultiplexers 214 and 216 are applied to a control circuit 254 which provides the reference signals for the phase-locked loop circuit 208 and for a second phase-locked loop circuit 256 providing the reference signal for the chrominance decoder 238. The control circuit 254 further applies the digital audio signals from the respective second outputs of demultiplexers 214 and 216 to memories 258 and 260 at the received data rate of 6 Mb/s each. The data is read out at its lower original data rate to form two continuous signals which are applied to D/A converters 262 and 264 and to low-pass filters 266 and 268 which provide the analog left and right audio signals.

It should be noted that the term "transmission" as used herein encompasses broadcasting, recording, wire transmission, and any other means for transferring information from one time and/or place to another.

Numerous alterations of the structure herein disclosed will suggest themselves to those skilled in the art. However, it is to be understood that the described embodiment is for purposes of illustration only and not to be construed as a limitation of the invention. All such modifications which do not depart from the spirit of the invention are intended to be included within the scope of the appended claims.

What is claimed is:

1. An apparatus for encoding and transmitting high definition television signals comprising consecutively arranged scanning lines forming a picture frame, said scanning lines each having an active video portion having a time duration less that that of said scanning lines and including a luminance component and at least one chrominance component, said apparatus comprising:

means for separating the high definition television signals into two complementary signals;

means for separating a portion of one of the two complementary signals corresponding to a standard video signal;

means for transmitting this portion over a first standard transmission channel;

means for dividing the other of the two complementary signals into consecutive base intervals, each base interval having a predetermined time duration, wherein said consecutive base intervals are said scanning lines and said predetermined time duration being the time duration of each of said scanning lines;

matrix means coupled to said dividing means for separately providing said luminance and chrominance components at respective outputs thereof;

means coupled to the luminance output of said matrix means, for time delaying every other one of the base intervals of the luminance component for said predetermined time duration such that consecutive two base intervals of the luminance component appear simultaneously;

first and second means, coupled to the time delaying means, for time expanding the pairs of base intervals by a factor of two thereby reducing the bandwidth thereof, said first and second time expanding means performing said factor of two expansion by expanding the active video poriton of each of said scanning lines of the luminance component by a factor of 7:3;

means, coupled to the chrominance output of said matrix means, for suppressing alternate base intervals of said chrominance component corresponding, in time, to said base intervals of said luminance component being delayed in said time delaying means;

third means, coupled to an output of said suppressing means, for time expanding the active video portion of each of the scanning lines of said unsuppressed chrominance component by a factor of 7:3;

means for combining the luminance component at the output of said second time expanding means with the chrominance component at an output of said third time expanding means;

means for amplitude modulating in quadrature each time the signals at the output of said combining means and at the output of said first time expanding means onto a carrier having a frequency located in a transmission band; and means for transmitting the quadrature modulated signal over a second standard transmission channel.

2. An apparatus as claimed in claim 1, wherein said apparatus further comprises means for bandwidth limiting the luminance component at the output of said second expanding means, whereby said bandwidth limited luminance component and said chrominance component are separated from each other in frequency.

3. An apparatus as claimed in claim 2, wherein said apparatus further comprises means path for time expanding by a factor of 8:3 said separated portion of said one complementary signal prior to being transmitted by said transmitting means, and means for time expanding by a factor of 2:1 said other complementary signal prior to being divided in said dividing means.

4. An apparatus as claimed in claim 3, wherein said means for separating the high definition television signals and for separating said portion of said one complementary signal comprises demultiplexing means coupled to receive said high definition television signal.

5. An apparatus for receiving high definition television signals encoded in accordance with said apparatus as claimed in claim 4, wherein said receiving apparatus comprises:

means for receiving said encoded high definition television signals transmitted on said first and second standard television channels;

first time compressing means for time compressing by a factor of 3:8 the signals received on said first standard television channel;

means for quadrature demodulating said signals received on said second standard television channel forming an in-phase and a quadrature signal;

second time compressing means for time compressing said in-phase signal by a factor of 7:3;

means for separating said luminance signal from said chrominance signal in said quadrature signal;

third time compressing means for time compressing said luminance signal by a factor of 7:3;

delaying means for delaying said compressed luminance signal for a period of one line interval;

multiplexing means coupled to said second time compressing means and said delaying means for alternately providing the output signals therefrom as a combined luminance signal;

fourth time compressing means for time compressing said chrominance signal by a factor of 7:3;

matrix means coupled to said multiplexing means and said fourth time compressing means for providing reconstituted enhancement signals;

fifth time compressing means for time compressing by a factor of two the reconstituted enhancement signals; and means for combining the output of said first time compressing means with the output of said fifth time compressing means to reconstitute said high definition television signals.

6. An apparatus for receiving encoded high definition television signals as claimed in claim 5, wherein said apparatus further comprises means coupled to said first and fifth time compressing means for interpolating a portion of said one complementary signal not corresponding to said standard video signal, an output of said interpolating means being coupled to a further input of said combining means.

* * * * *

UNITED STATES PATENT AND TRADEMARK OFFICE
CERTIFICATE OF CORRECTION

PATENT NO. : 5,001,551
DATED : March 19, 1991
INVENTOR(S) : Otto Detlev

It is certified that error appears in the above-identified patent and that said Letters Patent is hereby corrected as shown below:

Title page: Item (54) and column 1;

In the title, change "NISC" to --NTSC--.

Signed and Sealed this

Fourth Day of August, 1992

Attest:

DOUGLAS B. COMER

*Attesting Officer*  *Acting Commissioner of Patents and Trademarks*